Sept. 15, 1970 — T. H. LEWIS — 3,529,074
EXTERNAL BUSBAR SYSTEM
Filed May 7, 1968

INVENTOR
THOMAS H. LEWIS
BY
Lyon & Lyon
ATTORNEYS

United States Patent Office 3,529,074
Patented Sept. 15, 1970

3,529,074
EXTERNAL BUSBAR SYSTEM
Thomas H. Lewis, Canoga Park, Calif., assignor to The Sierracin Corporation, Sylmar, Calif., a corporation of California
Filed May 7, 1968, Ser. No. 727,180
Int. Cl. H05b *3/06;* H05k *1/06*
U.S. Cl. 174—68.5                                    16 Claims

ABSTRACT OF THE DISCLOSURE

This patent describes a novel laminated structure comprising two outer layers, a layer of tough flexible soft plastic interlayer material or adhesive adhered to the inner surface of at least one of said outer layers, between said outer layers an electrically conductive coating which coating extends beyond an edge of at least one of said outer layers, and at least one electrically conductive busbar positioned externally to at least one of said outer layers and being electrically connectetd to that portion of the electrically conductive coating extending beyond an edge of at least one of said outer layers. This patent additionally describes methods for the fabrication of the novel laminated structure of the present invention.

BACKGROUND OF THE INVENTION

The field of the present invention pertains to laminated structures provided with electrically conductive films and busbars, and their method of fabrication.

One of the most widespread and useful types of laminated structures incorporating a conductive coating is the transparent laminated safety glass structure which includes a transparent electrically heated coating applied to the inside protected surface of one of the layers of glass used in the laminate. The coating is provided with electrical busbars and electrical connections so that electrical current may be applied to heat the coating and the laminated safety glass to prevent the formation of fog or ice on the outside surface. These electrically heated coatings are well known in the art, particularly for use in laminated safety glass windshields for aircraft, and include the tin oxide type, thin films of gold or copper, or other electrical conductors deposited under vacuum on the glass. Coatings suitable for electrical heating of the safety glass may be also used for radio frequency attenuation or shielding.

Such transparent laminated safety glass structures provided with electrically conducttive coatings have been previously developed. One example of an advanced form of such a structure is described in assignee's copending U.S. patetnt application Ser. No. 634,296, filed Apr. 27, 1967, the disclosure of which is expressly incorporated herein by reference. In every transparent laminated glass structure provided with an electrtically conductive coating, the powering of the electrically conductive coating for heating, deicing, defogging and similar purposes necessitates the use of an electrically conductive busbar to distribute uniformly the input current to the electrically conductive coating. In the prior art, the standard practice has been to position the busbars within the laminate before the time of lamination. The busbars take the form of metal strips, metal braid, silver loaded resin or the like, and having a not insubstantial thickness with respect to the thickness of the interlayer material. This might be referred to as the profile height of the busbar. In addition, the physical properties of the busbar material, most relevantly, the coefficient of thermal expansion of the metal busbar, differ grossly from those of the surrounding plastic interlayer of glass and glass-like outer layers.

This difference in thermal expansion properties of busbars and adjacent components can produce serious deterioration of the adhesive bond between the busbars and the adjacent components, resulting in a decreased structural integrity and shortened service life of the entire electrically heated laminate. This is one example of a shortcoming of presently used electrically heated laminates in which the busbar is incorporated within the laminate.

Due to the profile height of the busbars, as well as differences in coefficient of expansion of the various materials, there is a tendency for delamination to occur around the internal busbars. Normally it is not possible to reduce the profile height of the busbar by increasing the width because of the resulting obstruction of the area of vision. The product of the profile height and the width constitute the cross-sectional area of the busbar, and this cannot be reduced below a certain minimum without severe penalties in electrical conductivity of the busbar. Since the function of the busbar is to distribute electrical current with a minimum of power dissipation in the busbar itself, it is desirable that the busbar electrical conductivity, and hence cross-sectional area, be kept as great as is practicable. Obviously, the greater the power input to the heated laminate, the greater the cross-sectional area of the busbar must be. The fact that the plastic used as an interlayer expands about ten times as fast as metal creates stresses between the busbar and the plastic when the laminate is heated, thereby tending to cause delamination between the busbar and the plastic. Delamination around the busbar has proven to be a major problem because upon delimation a gap is produced which causes electrical breakdown and/or burn out of the entire laminated structure. Accordingly, there has been a long-felt need for an improved laminated structure having an electrically conductive coating and a busbar. The present invention is directed specifically to the solution of these problems, and to a novel electrically conductive laminate in which delamination around the busbar is eliminated while still permitting use of highly efficient busbars of sufficient electrical conductivity to satisfy even the most stringent requirements of high power input to the laminate.

The present invention is also applicable to electrically conductive structures which do not require high power input, for example, in electrically conductive transparencies used to attenuate radio frequency transmission. In this case the electrically conductive transparency is generally used to cover a viewing aperture in a metal case or enclosure and must be electrically continuous with the case at all directions in the plane of the aperture, thus requiring a circumferential, continuous busbar which can be regarded as an electrical gasket.

SUMMARY OF THE INVENTION

Briefly, the present invention comprises a laminated structure comprising two outer layers, which can be rigid, transparent glass-like material, a layer of adhesive or tough flexible soft plastic interlayer material adhered to the inner surface of at least one layer of said outer layers, an electrically conductive coating between said outer layers, which coating extends beyond an edge of at least one of said outer layers, and an electrically conductive busbar positioned externally to at least one of said outer layers and being electrically connected to that portion of the electrically conductive coating extending beyond at least one of said outer layers. This patent additionally describes methods for the fabrication of the novel laminated structure of the present invention.

As used herein, the term "transparent" means having the property of transmitting light without appreciable scattering so that bodies beyond are entirely visible.

It is an object of the present invention to provide a novel laminated structure having an electrically conductive coating and an external busbar.

It is a further object of the present invention to overcome the delamination problems associated with the positioning of busbars between the outer layers of a laminate.

Yet another object of the present invention is to provide various novel assembly procedures for laminates having external busbars.

These and other objects and advantages of the invention will become apparent from the more detailed description which follows when taken in conjunction with the accompanying drawings.

DESCRIPTION OF THE PREFERRED EMBODIMENTS

Turning to the drawings.

Figure 5:
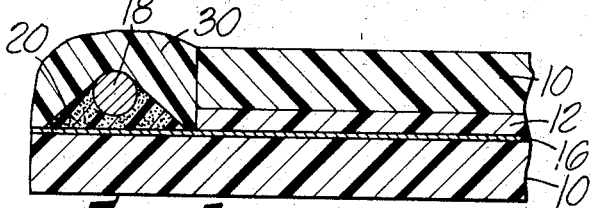

FIG. 5 shows a sectional view of another configuration of the present invention in which the electrically conductive coating is applied to one of the outer layers, which layer extends beyond the corresponding edge of the other layers of the laminate to form an offset or shelf-like projection and the busbar is held in place in the offset and electrically connected to the conductive coating by an electrically conductive adhesive.

Figure 6:
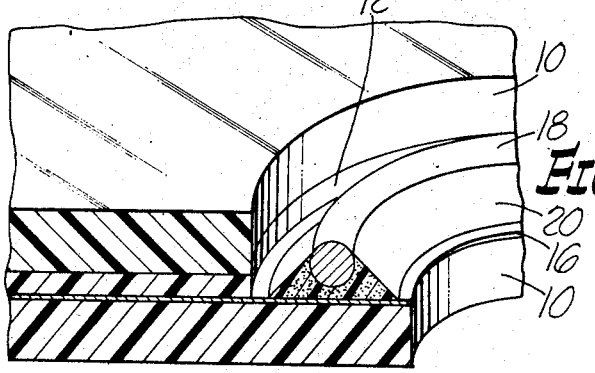

FIG. 6 is a perspective view in partial breakaway, and shows the application of the embodiment of FIG. 5 to a curved surface.

Figure 7:
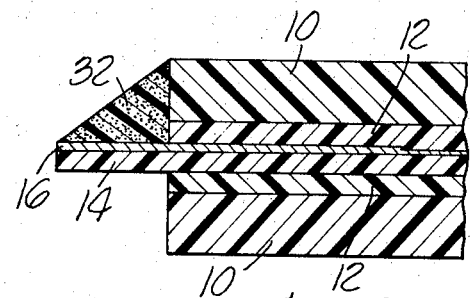

FIG. 7 shows, in section, still another embodiment of the invention wherein the busbar is in the form of a metal-loaded adhesive which bonds to that portion of the electrically conductive coating which extends beyond the edge of the laminate. In this embodiment, wherein the mass of metal-loaded adhesive is sufficient to render it highly conductive, the need for a monolithic busbar is eliminated. FIG. 7 shows the conductive coating on a flexible carrier layer, but the disposition or support of the conductive coating does not affect the substitution of highly conductive metal-filled adhesive for the monolithic busbar.

Figure 8A:
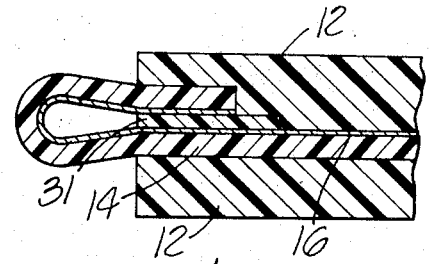
Figure 8B:
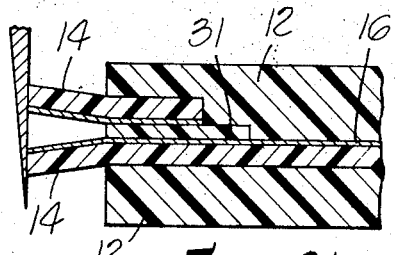
Figure 8C:
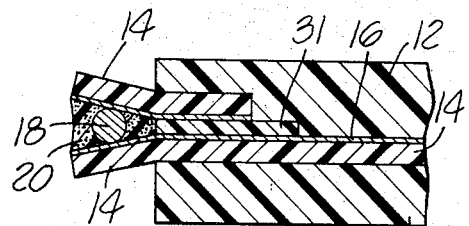

FIGS. 8a, 8b, and 8c are sectional views of yet another embodiment of the invention wherein the flexible carrier layer carrying the electrically conductive metal coating is folded over so that the edge of the carrier layer is bonded between the two outer layers of the laminate, and the busbar subsequently positioned in the folded over area by slitting the same and inserting the busbar in the slit. The final configuration shown in FIG. 8c can of course be generated by other techniques such as application of a ribbon of flexible carrier layer material, which may carry an electrically conductive coating, in contact with the flexible carrier layer carrying the main conductive coating and extending beyond the edge of the laminate to the same extent as does the carrier layer carrying the main conductive coating. The juxtaposition of these two flexible carrier layers then provides a space which is bounded by the two flexible carrier layers when spread apart or separated and which can then receive and accommodate the busbar and electrically conductive metal-filled adhesive. The particular sequence of operations illustrated in FIGS. 8a, 8b, and 8c is intended to demonstrate one technique which may find special application.

Figure 1:
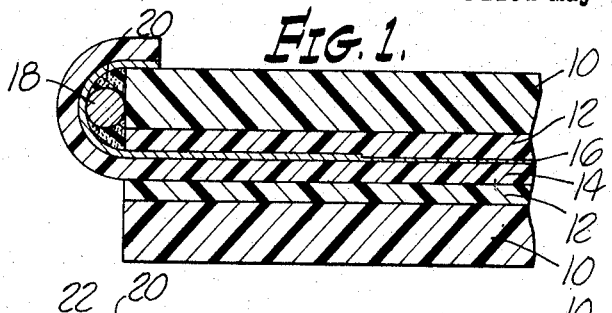
FIG. 1 shows one embodiment of the present invention in section wherein a flexible carrier layer carrying an electrically conductive coating is used to enclose the external busbar, which is shown attached to the edge of the top outer layer and external to the laminate.

Turning to the drawings in greater detail, FIG. 1 shows a laminate in which the outer layers, which may be transparent and glass-like, have adhered to each of their surface interlayers 12. The plastic carrier layer 14 is an organic film such as .005" Mylar and carries electrically conductive coating 16. The carrier layer 14 extends beyond the edge of the laminate and encloses the busbar 18. Electrical connection between the electrically conductive coating 16 and the busbar 18 is provided by electrically conductive adhesive 20. Any electrically conductive adhesive such as silver-loaded epoxy resin, silver-loaded silicon rubber, or other similar material familiar to those skilled in the art is utilized to adhere the busbar to the electrically conductive layer 16.

Figure 2:
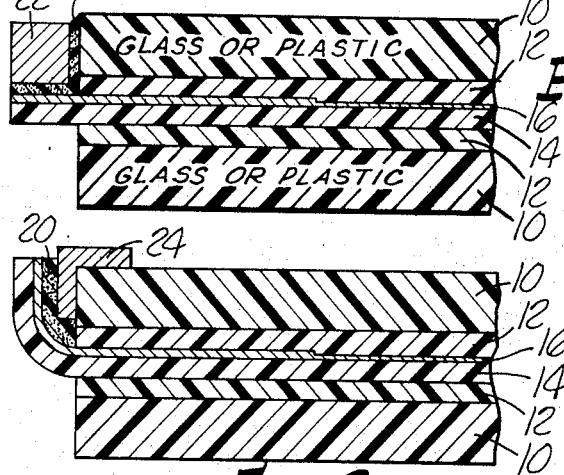
FIG. 2 shows another arrangement in section in which an electrically conductive coating on a flexible carrier layer extends beyond the edge of the laminate and is connected to the busbar by an electrically conductive adhesive without enclosing the busbar.

In FIG. 2, it is shown that the carrier layer 16 need not enclose the busbar 18. The carrier layer can also extend out of the laminate without being wrapped around. In this case, the carrier layer is bonded to a busbar 22 of square or rectangular cross-section or otherwise providing a planar contact area with the electrically conductive adhesive 20.

Figure 3:
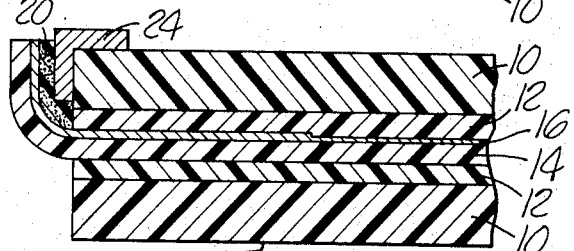
FIG. 3 shows a sectional view of an arrangement in which the flexible carrier layer carrying the electrically conductive film is turned up at the edge and bonded by an electrically conductive adhesive to the busbar.

FIG. 3 shows a configuration in which the carrier layer encloses the busbar 24. The busbar 24 may be any conductor such as copper tape which is bonded or mechanically fixed to the outer layer 10.

Figure 4:
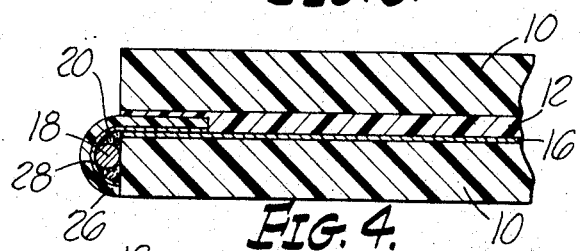
FIG. 4 shows a sectional view of an embodiment in which the main part of the electrically conductive coating is applied to one of the outer layers and a thin flexible layer carrying a conductive coating is positioned within the laminate and adjacent to the edge of the laminate and is applied around the edge of the laminate so as to project beyond the same and encloses the busbar.

In FIG. 4, the electrically conductive coating 18 is applied to one of the outer layers 10. The flexible ribbon 26 which is applied to the edge of the laminate carries an electrically conductive coating 28 which is used to enclose the busbar 18. As is apparent from FIG. 4, the expression "electrically conductive coating" as used herein and in the claims includes both continuous coatings, as well as those which are joined together by overlapping joints and the like.

The arrangement shown in FIG. 5 differs from the others in that the electrically conductive coating is not deposited on a flexible carrier layer. All of the electrically conductive film is deposited on the outer layer 10, which may be transparent and glass-like. The busbar is then attached to the projecting electrically conductive surface 16 using an electrically conductive adhesive 20. The projecting region of the conductive surface 16 may be built up or augmented with conductive material resulting in a locally thicker conductive coating so that contact with the electrically conductive adhesive 20 can be accomplished without damage to the main electrically conductive coating 16. This configuration is particularly applicable to a curved busbar system such as shown at FIG. 6. The other embodiments shown are also applicable to curved systems. In the case of a wrap-around flexible carrier layer which encloses the busbar, wrinkling can be eliminated by slitting or cutting tabs in the projecting edge of the carrier layer at closely spaced intervals. As shown in FIG. 5, the entire busbar structure may be encapsulated in a casting resin 30, or other protective material.

In FIG. 7, there is shown a system in which a monolithic-type busbar is eliminated. In this embodiment the mass of electrically conductive adhesive 32 is used as the busbar. This type of busbar construction is also applicable to all of the other configurations which the present invention may take.

Another embodiment of the present invention is the trim folded-over tab concept shown in FIGS. 8a through 8c. The electrically conductive coating 16 is deposited on the flexible carrier layer 14. The edge of the carrier layer is folded over before lamination, and laminated as shown in FIG. 8a. This lamination may be performed in discrete steps, culminating in a final, thoroughly laminated structure with outer layers and with the carrier layer which carries the conductive coating being adhered to a layer of tough, flexible, soft, interlayer material. In an especially convenient and useful first such laminating step, to which the present invention is particularly applicable, the flexible carrier layer, carrying the conductive coating, is laminated on one or both of its sides to a layer of tough, flexible, soft, plastic interlayer material. This stratified construction is designated a prelaminate and can be rolled up or used directly for lamination between sheets of outer layer material, which may be transparent and glass-like. The final lamination may be promoted and adherence assured by the application to the stratified construction or the outer layers of an adhesive, which may be transparent. Heat and/or pressure may also be used in lieu of or together with adhesive. In general, where only one side of the carrier layer is laminated to interlayer material, the use of adhesive to bond the outer layer to the carrier layer is mandatory.

A reinforcing layer of electrically conductive material 31 is deposited on the electrically conductive coating 16 in the region of contact with the edge of the folded-over tab so that the edge of the tab will not damage the electrically conductive coating 16 when subjected to the lamination pressure.

The extending folded-over tab is trimmed as shown in FIG. 8b to expose the electrically conductive film on the inner side thereof. An electrically conductive busbar 18 is then inserted into the unlaminated opening at the edge and cemented in place with electrically conductive adhesive 20. An advantage to this technique is the fact that the electrically conductive coating is never exposed during final lamination and is, therefore, protected by the flexible carrier layer throughout.

The electrically conductive coating 16 is in one preferred embodimnet deposited on the flexible carrier layer 14 which subsequently is laminated using layers of interlayer material on each side of the carrier layer as shown in FIGS. 1-3 and 7. It is to be understood that in accordance with the practice of assignee's above-identified copending application, the interlayers 12 and the carrier layer 14 carrying the electrically conductive coating 16 may be prelaminated with the carrier layer 14 extending beyond the ends of the interlayers 12, or as shown in FIGS. 8a–8c, folded over to form a loop-like projection. Subsequently such a prelaminate may be finally laminated with the outer-layer members 10 and the insertion of the busbar completed. In FIG. 1, the system shown is a complete laminate with the outer layers in place with the carrier layer enclosing the busbar.

In the systems of the present invention, the busbar is normally bonded to the electrically conductive coating by a conductive adhesive. In many situations, this adhesive can be solder or need not even be used at all. If no adhesive is used, some other means can be utilized to retain the busbar against the electrically conductive layer. This could be done by an edge retainer to clamp the busbar to the electrically conductive film. In addition, the busbar can be an integral part of the edge retainer or window frame, where such means are used. The busbar can be bonded to the electrically conductive layer either continuously or in spots, as required.

In the case where a flexible tape carrying electrically conductive coating thereon is used, such as in FIG. 4, the surface of the tape can be metallized or contain small imbedded wires. The bonding of the tape to the edges of the laminate can be accomplished by conductive adhesive of either the pressure sensitive or thermal curing type or a combination thereof.

FIGS. 1-3 show the electrically conductive coating 16 to be thicker near the outboard edge of the laminate. This kind of arrangement is frequently advantageous to permit a more nearly continuous electrical connection from the busbar to the main area of the electrically conductive film, and to minimize mechanical damage to the electrically conductive film at the busbar connection. However, this is not necessary and in many cases the electrically conductive film would be of uniform thickness, as shown in FIGS. 4–8.

The following examples are presented solely to illustrate the invention and should not be regarded as limiting in any way.

EXAMPLE I

A film of FEP Teflon (fluoroethylpropylene) was used for the carrier layer 14. The Teflon had a thickness of about 0.005". The electrically conductive coating 16 was gold applied using vacuum evaporation techniques familiar to those skilled in the art. A greater thickness of the gold was deposited at that edge of the Teflon which was intended to extend past the edge of the laminate. This greater thickness resulted in opacity of the region to which it was applied and served to protect the conductive coating against mechanical damage. Both the upper and lower layers were 6" x 6" x 1/8" glass. The metal coated Teflon was bonded to the bottom layer of glass using a polyester adhesive. A polyvinyl butyral interlayer was inserted between the metal film and the upper glass layer, and then the entire system was laminated in a Carver Press at 200° F. and 200 lbs. per square inch for approximately one hour. A silver-loaded, curable epoxy resin was applied to the metal surface extending from the edge of the laminate, and tinned copper braid was then applied to the epoxy resin. The edge flap was then wrapped around so as to enclose the epoxy resin and braid and held in place with tape until the epoxy resin had cured. The laminate was electrically powered to one watt per square inch for two minutes and the part was observed to be uniformly heated. The power was increased to five watts per square inch for two minutes, the heating was still found to be uniform and powering had to be stopped only to prevent bubbling of the vinyl interlayer. The glass layer adjacent the metal coating was very hot, in excess of 140° F.

EXAMPLE II

A 6" x 8" film of cellulose triacetate of approximately 0.005" thickness was used as the carrier layer 14. A deposit of gold was applied to the cellulose triacetate using vacuum evaporation techniques to form the electrically conductive coating 16. A greater thickness of gold was applied to the opposite edge regions of the film resulting in opaque metallized strips 3" wide and 6" long straddling the 4" x 6" transparent electrically conductive central region. A strip approximately 1¼" wide at each 6" long, heavily coated edge was then folded over and brought into contact with the thick opaque conductive coating leaving a double layered or looped edge along the 6" dimension. A 0.030" thick 6" x 6" layer of polyvinyl butyral was applied to both faces of the folded over carrier layer and this composition was in turn inserted between plates of 6" x 6" x 1/8" glass. The entire stratified composition was laminated in a Carver Press at 200° F. and 200 lbs. per square inch for approximately one hour. The lamination securely fixed the folded over edges of the carrier layer internal to the laminated unitary structure, leaving the looped 6" long edges external. These loops were cut open using ordinary scissors; the two flaps were spread apart and the region bounded by them was filled with a silver-loaded, curable epoxy resin. The flaps were then folded down to enclose the silver-loaded resin and were secured with ordinary masking tape until the epoxy had cured. The laminate was electrically powered to approximately one watt per square inch for about one minute.

It is to be understood that the present invention is not limited to any particular materials of construction. The outer layers are normally glass, acrylic, or other normally rigid transparent materials. Various interlayer materials are commercially available and in any event those skilled in the art can readily appreciate that any such materials are applicable in the present invention. The electrically conductive coating is normally a conductive metal. However, various conductive non-metallic coatings such as electrically conductive tin oxide are also within the scope of the present invention.

The invention is applicable to any laminated structure which is electrically conductive. As will be immediately apparent to those skilled in the art from the foregoing disclosure, the present invention will find wide application in the fabrication of electrically conductive windshields, canopies, and similar structures.

I claim:

1. A laminated structure comprising two outer layers, a layer of tough, flexible, soft, plastic interlayer material adhered to the inner surface of at least one of said outer layers, a flexible carrier layer having thereon an electrically conductive coating positioned between said outer layers which extends beyond an edge of at least one of said outer layers, and an electrically conductive busbar positioned externally to at least one of said outer layers and being electrically connected to that portion of said electrically conductive coating extending beyond at least one of said outer layers, all said layers bonded to adjacent layers to form a unitary structure.

2. The structure of claim 1 wherein the outer layers are transparent and the entire structure has useful visible transparencey.

3. The structure of claim 1 wherein the outer layers are of a rigid, glass-like material.

4. The structure of claim 1 wherein the extending portion of said electrically conductive coating is wrapped around said busbar and encloses same and is in electrical contact therewith.

5. The structure of claim 1 wherein the extending portion of said electrically conductive coating is provided by a flexible tape carrying an electrically conductive coating and which is attached to the edge of one of said outer layers and is wrapped around said busbar and encloses same.

6. The structure of claim 1 wherein said busbar is encapsulated in a casting resin composition.

7. The structure of claim 1 wherein the busbar is a mass of an electrically conductive resinous material.

8. The structure of claim 1 wherein the busbar is an electrically conductive metal.

9. The structure of claim 1, wherein the extending portion of said electrically conductive coating is provided by a flexible tape possessing intrinsic electrical conductivity and which is attached to the edge of one of said outer layers and is wrapped around said bushbar and encloses the same.

10. A laminated structure comprising two outer layers, one of said outer layers extending beyond the edge of the other to provide an offset, a layer of tough, flexible, soft plastic interlayer material adhered to the inner surface of at least one of said outer layers, an electrically conductive coating positioned between said outer layers and extending into said offset, and an electrically conductive busbar positioned in said offset in electrical contact with said electrically conductive coating thereon, all said layers being bonded to adjacent layers to form a unitary structure.

11. The method of preparing a laminated structure which comprises preassembling a carrier layer having thereon an electrically conductive coating and a layer of plastic interlayer material on at least one side thereof, said carrier layer extending beyond at least one edge of said plastic interlayer material to provide exposed electrically conductive coating, positioning a sheet of material on each side of the preassembly so that electrically conductive coating remains exposed, laminating to form a unitary structure, and thereafter applying a busbar to said exposed electrically conductive film.

12. The method of claim 11 which comprises the additional steps of (1) folding the portion of the carrier layer extending beyond the edge of the interlayer material over to form a loop, and (2) slitting said loop prior to application of said bushbar.

13. The method of claim 11 which additionally comprises the step of wrapping the portion of the carrier layer extending beyond the edge of the interlayer material around to enclose said busbar.

14. The method of claim 11 which additionally comprises the step of applying an electrically conductive adhesive to the exposed electrically conductive coating in the application of said bushbar to said coating.

15. A laminated structure comprising two outer layers, one of said outer layers extending beyond the other, layer of tough, flexible, soft, plastic interlayer material adhered to the inner surface of at least one of said outer layers, an electrically conductive coating on the inner surface of said extending outer layer and an electrically conductive busbar positioned externally to at least one of said outer layers and being in electrical contact with the electrically conductive coating on said extending layer, all said layers bonded to adjacent layers to form a unitary structure.

16. The method of preparing a laminated structure which comprises applying an electrically conductive coating to a surface of an outer layer, applying an offset interlayer material and a second outer layer to leave part of said coating exposed at the edge of the assembly, laminating, applying an electrically conductive adhesive to said exposed coating, and electrically connecting a busbar to said conductive coating by said adhesive.

References Cited

UNITED STATES PATENTS

| | | | |
|---|---|---|---|
| 2,648,754 | 8/1953 | Lytle | 338—309 XR |
| 2,982,934 | 5/1961 | Browne | 338—309 XR |
| 3,304,401 | 2/1967 | Long | 219—10.55 |
| 3,356,833 | 12/1967 | Orcutt | 219—522 |
| 3,431,348 | 3/1969 | Nellis et al. | |

DARRELL L. CLAY, Primary Examiner

U.S. Cl. X.R.

29—611, 625; 219—522; 338—308, 309